Feb. 21, 1928.
H. P. PARRIGIN
VALVE
Filed June 10, 1926
1,659,743
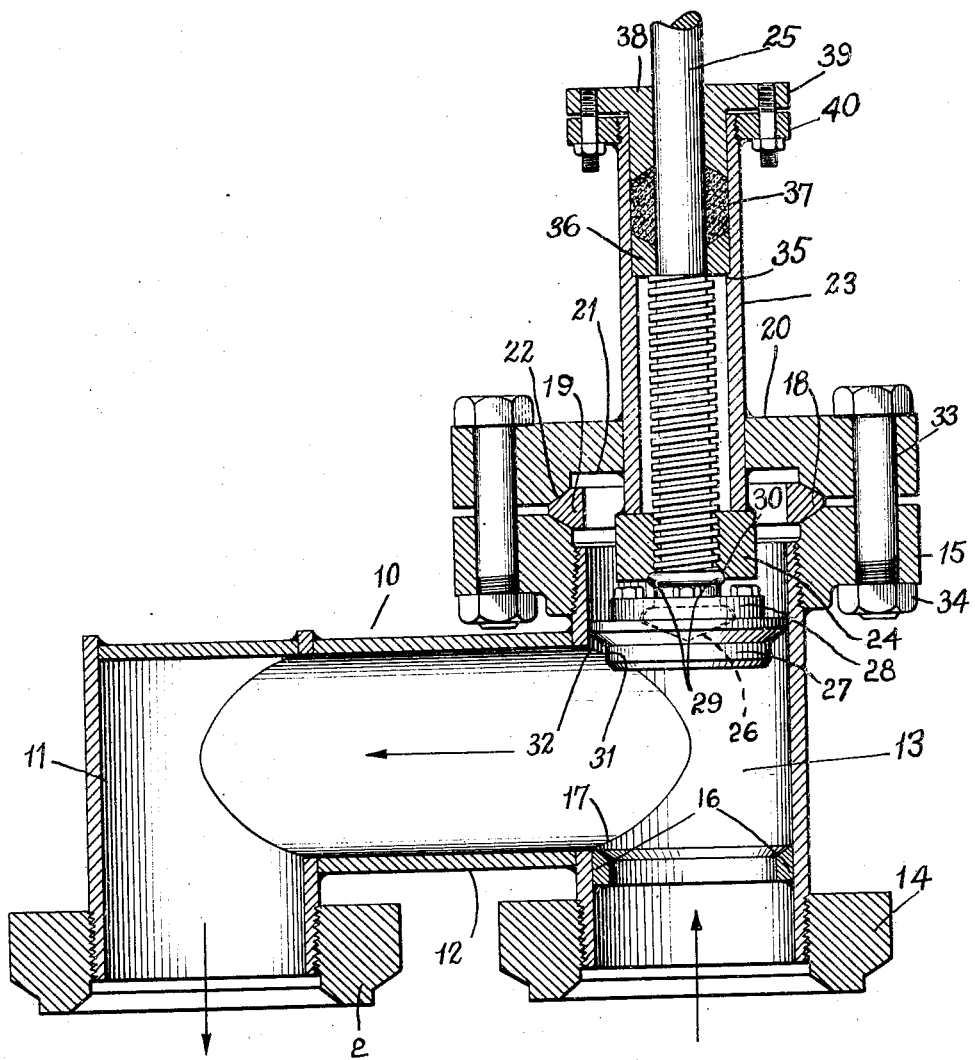
Inventor
Homer P. Parrigin
By his Attorney
R. J. Dearborn Patented Feb. 21, 1928.

1,659,743

UNITED STATES PATENT OFFICE.

HOMER P. PARRIGIN, OF GATES, TEXAS, ASSIGNOR, BY MESNE ASSIGNMENTS, TO THE TEXAS COMPANY, OF NEW YORK, N. Y., A CORPORATION OF DELAWARE.

VALVE.

Application filed June 10, 1926. Serial No. 114,909.

This invention relates to improvements in control valves for distilling apparatus and to mountings for such valves.

One of the objects of the invention is to provide suitable valves for use in connection with oil distilling apparatus and which are capable of being controlled from a remote point so that in case of fire or other emergency the flow of oil through the apparatus can be instantly stopped.

Another object of the invention is to provide suitable mountings for such valves.

A still further object of the invention is to provide means for controlling and regulating such valves from a point removed therefrom and at a sufficient distance from the apparatus to be out of the danger zone in case of fire or the like.

Valves and valve housings embodying the present invention are particularly suited and adapted for use in connection with preheater units in which oil is preliminarily heated prior to being introduced into pressure or other stills. Thus when a fire or break occurs in the vicinity of the still the valve controlling the flow of oil to the still can be closed by an operator at a suitable distance from the danger zone thereby immediately stopping the flow of oil to the still and minimizing the danger caused by the fire or break. In practice several of the valves may be placed at various points in the preheater, particularly in the lower rows of the preheater coil.

The drawing is a partially sectional view of a return bend connecting two pipes of a preheater coil with a valve embodying the features of the present invention mounted thereon and being in open position.

Referring to the drawing there is shown a return bend indicated generally at 10 and formed of three pipe sections 11, 12 and 13, welded or otherwise secured together to form the desired return bend. The return bend 10 is shown ready for connection with a pair of tubes (not shown) of a preheater or other coil. Flanges 14 are threaded on to each end of the bend for the purpose of providing ball and socket joints with the pipes of the coil.

The pipe 13 extends somewhat beyond the point at which is connects with the pipe 12 and is threaded at its outer extremity. An annular flange 15, internally threaded throughout a portion of its length for engagement with the threaded extension of the pipe 13, is screwed thereon.

An annular ring 16 is welded within the pipe 13 at a point between the preheater coil and the connection between the pipes 12 and 13. The ring 16 is tapered at one end and the tapered portion constitutes a valve seat 17.

A portion of the flange 15 extends beyond the end of the pipe 13 and its inner periphery is formed with a slightly concaved groove, which groove constitutes a seat 18 for a packing ring 19 formed with convex faces, one of which fits in the concave seat 18.

An annular cap 20 of substantially the same diameter as the flange 15 is disposed above and secured to the flange 15. The cap 20 is formed with a centrally disposed depressed portion 21 corresponding in diameter to the orifice through the flange 15. The depressed portion leaves an annular shoulder, the inner periphery of which is formed with a slightly concaved groove, as 22, which constitutes a seat for the upper convex face of the packing ring 19. The cap 20 is also formed with a centrally disposed circular opening through which extends and into which is secured, as by welding or otherwise, an elongated tubular member 23. To the inner end of the tubular member 23 is secured, as by welding, an internally threaded nut 24.

A valve stem 25 extends through the tubular member 23. The stem is threaded through a portion of its length and the threaded or inner end works through the nut 24. The extreme inner end of the valve stem is provided with an enlarged head 26 to which a valve 27 is loosely mounted by means of a retaining clamp 28. The clamp 28 fits over the enlarged head 26 and is secured to the valve 27 by means of suitable machine screws. The valve stem 25 is formed with a boss 29 adapted to form a ground joint with a recess 30 in the nut 24 to prevent pressure fluid from working through the threads on the stem and thus from working against the packing.

The valve is formed with a cylindrical portion 31 which is adapted to slide through the ring 16 and a larger tapered portion 31 which is adapted to rest on the seat 17 to form a closure and stop the flow of oil through the pipe 13 and consequently through the entire preheater coil.

The cap 20 is secured to the flange 15 by means of bolts and nuts 33 and 34, and as already pointed out the packing ring 19 is disposed between the flange and cap so that when the bolts are tightened a liquid seal is formed, thus preventing the leakage of any oil.

The bore of the outer or free end of the tubular member 23 is of slightly greater diameter than that of the inner end thus forming an annular shoulder as at 35. A ring-like packing gland 36 is positioned around the outer end of the valve stem 25 and is seated upon the shoulder 35.

Packing material 37 is disposed around the valve stem and is retained in effective position by the gland 36. A second compression gland 38 is positioned partially within the tubing and is adapted to compress the packing material 37 into intimate contact with the valve stem 25 and the inner wall of the tubular member 23 to more effectively prevent leakage of any oil that might by chance work through the threads on the valve stem and the nut 24. The packing gland 38 is formed with a projecting annular flange 39 which is secured to an annular collar 40 threadedly secured on the extreme outer or free end of the tubular member 23. Suitable screws or bolts secure the flange and the collar together. It should be noted that the adjacent faces of the two packing rings are inwardly tapered so as to insure proper packing of the material between them.

It is understood that the valve stem may be of any desired length and an extension thereof may be provided so that the valve may be operated at a considerable distance from the preheater.

An apparatus of preferred form and construction has been illustrated and described for the purpose of showing a way in which this invention may be practiced, but the inventive thought upon which this application is based is broader than this illustrative embodiment thereof. It is, therefore, understood that the scope of the invention is not limited by the present disclosure, reference being had to the appended claim for that purpose.

What I claim is:

The combination with a return bend comprising spaced arms and a pipe connecting an end of one of the arms with the other arm intermediate its ends, of an annular flange secured on the extended end of the second named arm, a cap formed with a centrally disposed opening secured to said flange, means interposed between the inner peripheral edges of the flange and the cap for forming a fluid tight joint therebetween, means extending through the flange and cap for maintaining them in sealing position with respect to the sealing means, a tubular member threaded at its lower end extending through said opening, a threaded valve stem extending through the tubular member, a valve on one end of the valve stem adapted to form a closure for one arm of the return bend, and means for preventing the escape of pressure fluid between the valve stem and the tubular member.

In witness whereof I have hereunto set my hand this 31st day of May, 1926.

HOMER P. PARRIGIN.